(12) United States Patent
MacLean et al.

(10) Patent No.: US 7,869,700 B2
(45) Date of Patent: Jan. 11, 2011

(54) HIERARCHICAL DATA STORAGE

(75) Inventors: Roger F. MacLean, Nepean (CA);
Kenneth E. Maughan, Nepean (CA);
Christian Joseph Eric Montminy,
Ottawa (CA)

(73) Assignee: March Networks Corporation, Ottawa, Ontario (CA)

( * ) Notice: Subject to any disclaimer, the term of this patent is extended or adjusted under 35 U.S.C. 154(b) by 1210 days.

(21) Appl. No.: 11/458,530

(22) Filed: Jul. 19, 2006

(65) Prior Publication Data

US 2007/0081794 A1 Apr. 12, 2007

Related U.S. Application Data

(60) Provisional application No. 60/700,329, filed on Jul. 19, 2005.

(51) Int. Cl.
*H04N 7/26* (2006.01)
*H04N 5/00* (2006.01)
*H04N 5/14* (2006.01)
*H04N 5/91* (2006.01)
*H04N 7/00* (2006.01)
*H04N 7/12* (2006.01)
*H04N 11/00* (2006.01)
*G06K 9/36* (2006.01)

(52) U.S. Cl. ............... 386/354; 386/264; 386/335; 386/337; 386/357; 348/699; 375/240.12; 375/240.14; 375/240.16; 375/240.25; 375/240.26; 382/233; 382/235; 382/236; 382/238

(58) Field of Classification Search ............... 386/112, 386/37, 46, 123, 124, 125, E9.009; 348/699, 348/E5.007, E7.013, E7.014, E7.016; 375/240.12, 375/240.14, 240.16, 240.25, 240.26, E7.012, 375/E7.027, E7.09, E7.092, E7.124, E7.137, 375/E7.138, E7.163, E7.17, E7.181, E7.186, 375/E7.189, E7.209, E7.211, E7.254; 382/233, 382/235, 236, 238; G9B/27.012, 27.019
See application file for complete search history.

(56) References Cited

U.S. PATENT DOCUMENTS 5,884,056 A   3/1999  Steele
6,166,735 A   12/2000 Dom et al.

(Continued)

FOREIGN PATENT DOCUMENTS

WO    2004/057873 A1    7/2004

OTHER PUBLICATIONS www.video-insight.com/user%20manual.pdf, "Video Insight User Guide", Version 2.6. 2005.

(Continued)

*Primary Examiner*—Thai Tran
*Assistant Examiner*—Syed Y Hasan
(74) *Attorney, Agent, or Firm*—Curtis B. Behmann; Borden Ladner Gervais LLP

(57) ABSTRACT

A method and system for encoding and recording data in a multi-stream format when the data is initially captured. The multiple streams of data can be combined to provide a high quality, or high resolution, representation, while a reduced subset of the streams can provide a lower quality, or lower resolution, representation. Data storage requirements can be reduced, by deleting one or more of the streams, when there is no longer a need for retention of the data at the higher quality.

28 Claims, 4 Drawing Sheets

U.S. PATENT DOCUMENTS

| | | | | |
|---|---|---|---|---|
| 6,633,725 | B2 * | 10/2003 | Hughes et al. | 386/123 |
| 6,901,078 | B2 | 5/2005 | Morris | |
| 6,901,603 | B2 | 5/2005 | Zeidler et al. | |
| 7,146,056 | B2 * | 12/2006 | Klein Gunnewiek et al. | 382/236 |
| 7,386,049 | B2 * | 6/2008 | Garrido et al. | 375/240.15 |
| 2003/0133593 | A1 | 7/2003 | Tullberg et al. | |
| 2004/0071214 | A1 | 4/2004 | Burg et al. | |
| 2006/0098937 | A1 * | 5/2006 | Bruls et al. | 386/46 |

OTHER PUBLICATIONS

United Kingdom Patent Application No. 0803005.8, filed Feb. 19, 2008, Examination Report dated Apr. 8, 2010.

* cited by examiner

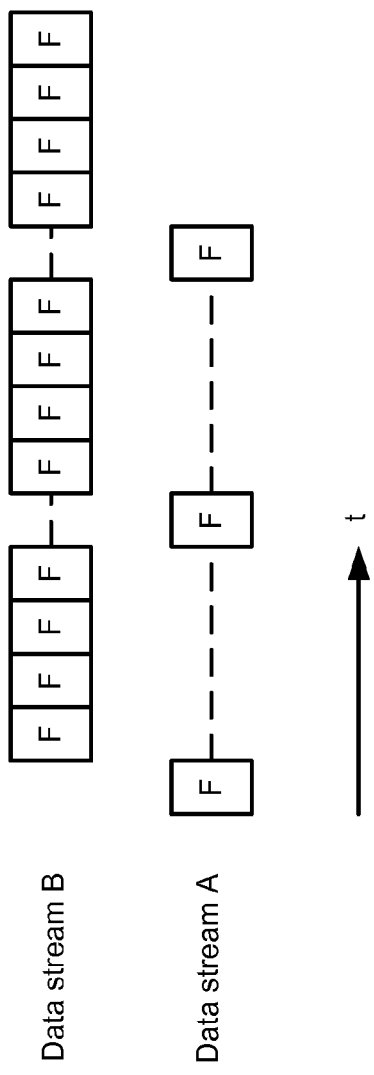
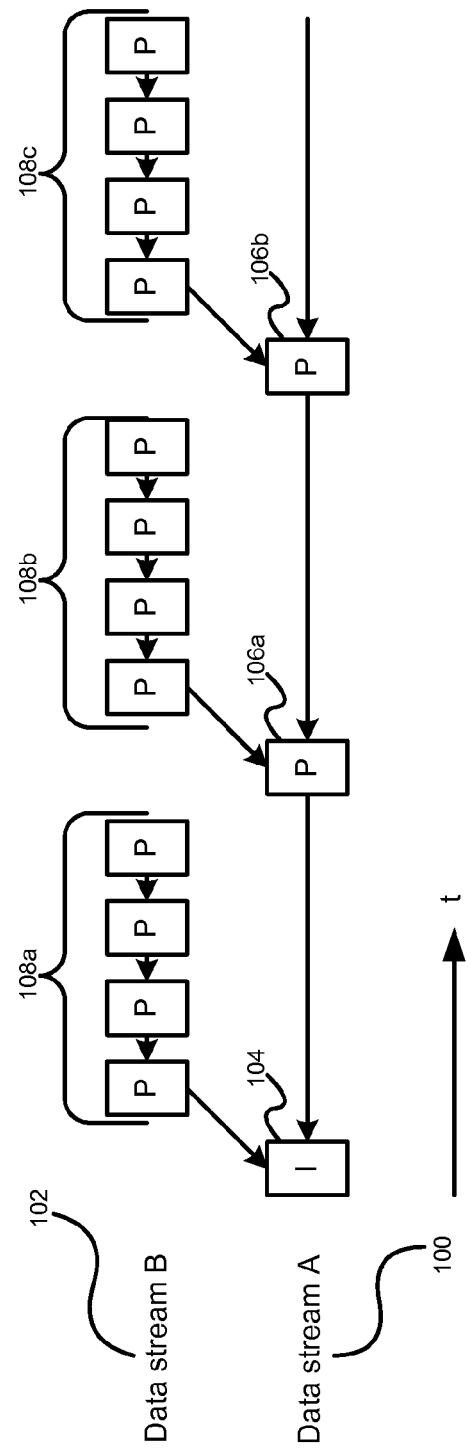

HIERARCHICAL DATA STORAGE

CROSS-REFERENCE TO RELATED APPLICATIONS

The present invention claims priority from U.S. Provisional Patent Application Ser. No. 60/700,329 filed on 19 Jul. 2005, which is incorporated herein by reference.

FIELD OF THE INVENTION

The present invention relates generally to storing data in a hierarchical manner. More particularly, the present invention relates to initial hierarchical storage using partial data streams that collectively form a continuous and complete data stream along with management and retrieval of such digital data, such as in a digital video recorder.

BACKGROUND OF THE INVENTION

Digital recording of data is now commonly used in security and surveillance applications. Typically, a Digital Video Recorder (DVR) records content, such as video, audio and often other data onto disks or other recording media. The recording is either done continuously or is triggered by specific events.

A DVR has a finite amount of recording space on which the recoded data is stored. Accordingly, the DVR can record for a finite amount of time. To allow for continuous use, the DVR storage space must be made available. To free storage space, the DVR periodically deletes data to make room for new recordings. Video data, in particular, can consume a great deal of space, and must be regularly deleted. Deletion of data can cause problems if the data is still needed by a user. To reduce the frequency of data deletion, and thus allow more data to be recorded, the DVR can capture data at a lower resolution, or can use higher degrees of lossy compression. Both use of a lower resolution and higher lossy degrees of compression result in a reduced quality video stream, which can be problematic if a higher quality video stream is required to properly analyze the data. It is well known, that at most times, only a reduced quality data stream is needed, with a higher quality data stream required only to capture information about a specific incident or event. One problem is that the higher quality image is often required before the event occurs so that an after-the-fact review can make use of information leading up to and following the event. A number of methods have been used to ensure that data is available when needed, and is available at the required quality. The different methods are not mutually exclusive, and are often combined.

The easiest method is to provide more storage space by installing large disk drives, or multiple drives. While this method is effective, it can also be costly, in some cases dominating the cost of the DVR.

Another approach is to record selectively. In this case, the DVR records only at "significant" times, such as in response to specific events (e.g. motion or alarms), or at previously scheduled times in the day. Because the DVR is not continuously recording there is a reduction in the amount of data captured. Thus, the DVR can operate for longer periods before reaching capacity. The disadvantage of this method is that the rules must be set up in advance. If the DVR is configured to record for too short a time after an event, important information may not be recorded. Alternately, if the DVR is configured to record for too long a time, the storage capacity issue may not be adequately addressed. As noted above, this also fails to provide any information leading up to the event.

Yet another approach is to adjust the recording parameters. By reducing the quality of the recorded video, by reducing its frame rate or by reducing the size of each frame, the volume of data can be reduced significantly. This has the obvious drawback that, while it might significantly reduce data rates and improve retention time, it might render the resulting data useless for its intended purpose. For example, video of a bank robbery may be of little use if the quality or frame size is not sufficient to recognize a person's face.

It is, therefore, desirable to provide a method and system for storing data that permits storage and retrieval of high quality recordings, while permitting storage space to be freed up when necessary.

SUMMARY OF THE INVENTION

It is an object of the present invention to obviate or mitigate at least one disadvantage of previous digital data recording and storage systems, particularly those associated with DVRs.

In a first aspect, the present invention provides a method for recording received data in a digital video recording system, comprising: encoding the input data to provide at least two digital data streams combinable to produce a high quality representation of the input data; and separately recording the at least two digital data streams to a storage medium. In a second aspect, the present invention provides a digital video recorder, comprising: a digital encoder for receiving input data, and outputting at least two digital data streams combinable to produce a high quality representation of the input data; and at least two data recorders for recording the at least two digital data streams to one or more data storage means.

In a third aspect, the present invention provides a digital video stream embodied within a digital video recording system, the stream including: a first subset of digital data corresponding to a first portion of a complete digital data stream, the first portion capable of reconstructing a reduced quality reproduction of the complete digital data stream; a second subset of digital data corresponding to a second portion of the complete digital data stream; and wherein the first and second subsets are combinable to reconstruct a high quality reproduction of the complete digital data stream.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

FIG. 2 is a first example of a multi-stream recording format according to the present invention;

FIG. 3 is a second example of a multi-stream recording format according to the present invention;

DETAILED DESCRIPTION

Figure 1:
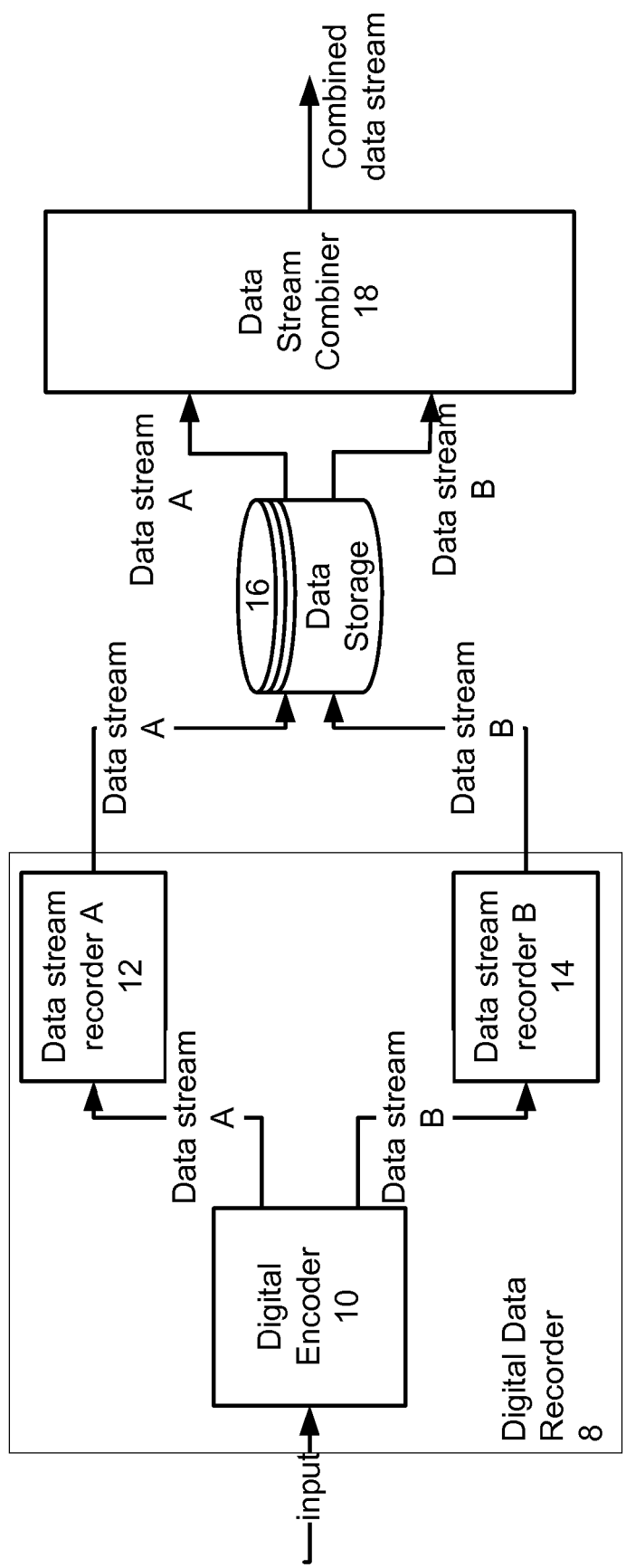
FIG. 1 is a block diagram of a recording subsystem for a DVR.

Generally, the present invention provides a method and system for encoding and recording data in a multi-stream format when it is initially captured. The multiple streams of data can be combined to provide a high quality, or high resolution, representation, while a reduced subset of the streams can provide a lower quality, or lower resolution, representation. Data storage requirements can be reduced, by deleting one or more of the streams, when there is no longer a need for retention of the data at the higher quality.

A method and system of the present invention provide for encoding a data stream in a hierarchical fashion. A single stream is partitioned into a plurality of streams, each of which are stored separately. At least one of the stream partitions can be accessed independently of the others, and provides a baseline low quality playback. Higher quality playback is provided by combining partitioned streams, which can provide multiple levels of quality based on the number of partitions. Thus, a data stream is stored in a hierarchical fashion by creating partitioned streams from the original data stream. The terms hierarchy and hierarchical used herein are defined to indicate that multiple data streams are formed having a range of quality from low (e.g., reduced frame rate) to high (e.g., relatively large frame rate) with possible levels of quality in-between within a third, fourth, . . . etc., intervening data stream. Including such different data streams within a hierarchical manner makes it possible to free up storage space by the simple expedient of deleting the files related to one of the different parts, which will result in the maintenance of an effectively lower quality data stream. In prior art solutions, transforming a high quality data stream to a low quality data stream involves an expensive re-processing of the data which is avoided by the method and system presented below.

In the most general sense of the present invention, a data stream is segmented or partitioned into N streams where N is some number greater than 1. Each of these N-streams is recorded separately. In one illustrative embodiment, N=2 such that there are 2 streams of data that are each recorded separately. However, it should be readily understood that more than 2 data streams can be used and thereby recorded separately. In any case of N streams, a subset of these N streams (e.g., streams 1 and 3, streams 1 and 2, stream 1 alone, or any combination where N=3) is further used to generate a reduced quality version of the original data. Generally, each subset generates a version of the data stream with a different quality. The permissible subsets are determined by how the N streams are encoded. For example, in the illustrative embodiment described herein, one can make use of just stream 1 or a combination of streams 1 and 2. Depending on how the data is encoded, it may be possible to also make use of stream 2 on its own, although in some embodiments, not every recorded stream can be used independently.

This invention takes advantage of the property of data types that can be represented in a number of manners and resolutions, allowing a tradeoff between data volume and fidelity of the representation. For example, very high quality video data can be saved at the cost of a great deal of storage, or lower quality data can be saved at a reduced frame rate, frame quality and/or picture size, resulting in a need for less storage space at the expense of lower quality data. The present invention allows one to store data for whatever period they want (e.g., 90 days) with reduced storage requirements, thereby reducing data storage costs. Similarly, audio can be captured at different sample rates allowing audio quality to be traded off against storage space. The following description discusses the storage of video data in a DVR system, since video data consumes an overwhelming majority of the storage space, but, as will be understood by those of skill in the art, the same techniques can be applied to audio and other data as well.

Other data may include temperature readings, pressure readings, flow rates, or any other sensed data that is indicative of some physical quality or interpretative information. Any sensed data, that can be obtained using high sample rates and that can be archived using a lower sample rate unless an event requiring the higher sample rate, can be used with systems of the present invention. For example, streamed video in a flammable environment may record video, audio, and temperature readings. In accordance with the present invention, high quality temperature data with numerous samplings may be retained only for so long as can be reasonably ascertained that a fire did not occur—e.g., a matter of days. Thereafter, the data samplings may be reduced to only one reading per hour. Likewise, the video data may only require retention of high quality data for a similarly short period. Thereafter, the video data may be reduced to a much lower frame rate—e.g., hourly frames or fewer. In accordance with the present invention, the sample temperature data is stored as a plurality of data streams that can be recombined to form a high quality data stream. The low resolution data stream can be denoted as stream A, while the additional data that in conjunction with stream A provides the high resolution data can be denoted as stream B. The first and second streams collectively form the high resolution data stream. In this manner, forensic evidence to document fires can be retained for only the relevant time period when a fire would have normally been discovered. For example, if no fires are discovered within five days from a given moment in time, then it is safe to delete the more complete version of the data stream leaving only the lower quality stream. Thus data stream B is deleted, leaving data stream A in place. In such applications including other data, a DVR system would of course include other mechanisms to capture and record data other than video and audio.

It has been recognized that storing a lower quality data stream requires less storage space than storing a high quality data stream. However, it is often very costly or inconvenient in terms of data processing to transform the high quality stream to the low one after the fact—i.e. using post processing after initially recording the data. A DVR that captures and records a large number of inputs may not be able to afford the extra processing and disk I/O requirements of reading previously recorded data, re-processing it and re-recording the result.

The present invention provides a mechanism to mitigate the problems of re-processing and re-recording by initially encoding the video as a hierarchy of two or more streams. The hierarchy of streams would include a low quality stream and a high quality stream with possible intermediate streams having a range of quality levels between high and low. Collectively, the low quality, high quality, and any intermediate streams would form a single, continuous stream. By combining all streams together video data of a very high quality can be reconstructed. A subset of the streams can be used to reproduce lower quality video. When the video data is processed in this manner where the multiple streams of varying quality are formed initially, the individual streams can be written to separate files, and post-recording quality reduction can be achieved in a much easier manner. Specifically, post-recording quality reduction may occur simply by deleting files. Deletion does not add any processing complexity as deletion is an operation that the DVR must do in any event as part of its normal data purging. If more than two streams are stored, the deletion of stream to reduce the video quality can be staggered so that the video quality is intentionally degraded over time as it becomes less important.

FIG. 1 shows a recording subsystem for a digital data recorder 8 such as a DVR. A digital encoder 10 receives an input signal such as an analog video signal, digitizes the signal, and outputs two or more streams of video data to data stream recorders 12 and 14. The recorders 12, 14 store the data streams A and B to suitable digital data storage medium 16, such as a hard drive, CD-R, tape or other medium. Data streams A and B are preferably compressed, either during encoding or during the recording steps. While FIG. 1 illustrates two streams, it should be readily understood that any of number of data streams and recorders can be used without straying from the intended scope of the present invention. The manner in which the data is recorded to the storage medium 16 is not critical, provided the recorded information is sufficient to allow the two (or more) recorded streams to be merged. For example, a typical DVR records the time each frame is captured, along with the frame. One way of merging two streams is to take the files representing the recordings, and present the frames from each in correct time order. In playback, the data streams are ready from storage 16 by data stream combiner 18 which combines the data streams and provides a combined data stream as an output. Combiner 18 can be integrated with other components in a playback system including a rendering engine.

In accordance with the present invention, the streams are generated such that the video information is divided between the streams and meets predetermined criteria. Such criteria includes that during playback of the video it should be possible to combine all streams to provide the highest quality video, or to use a subset of the streams to provide video of lower quality. Also, the volume of data in each individual stream is preferably less than if only a single high quality stream was generated. The combined volume for all streams may be greater than a single high quality stream, though ideally not greatly so.

There are numerous ways of generating multiple video streams depending on the compression and encoding methods used and the desired properties of the streams. The simplest method is depicted in FIG. 2. This diagram shows a sequence of frames where each frame is indicated by the letter F with time advancing from left to right. In this example, a sequence of frames is split into two streams where the data stream A is formed by taking every fifth frame, and data stream B consists of the remainder of the frames. This method is most applicable to compression methods, such as motion JPEG, where frames are encoded individually and do not make direct reference to preceding frames. In this case, if data streams A and B are recombined, video can be viewed at a high frame rate. At some later time after the initial recording, the files storing data stream B can be purged, reducing the storage space by approximately 80 percent. Once the second stream data has been purged, video for this time period is still available, though at a frame rate one fifth of the original.

The scheme shown in FIG. 3 is an alternative that can be used if using an encoding technique, such as MPEG 4 video compression, where frames make reference to preceding frames to increase the efficiency of encoding. In the MPEG 4 standard, there are several frame types defined. I frames are encoded without reference to any other frame and are thus independent. P frames are encoded relative to a previous frame, either I or P and contain partial frame information that describes differences between the frame and the related frame. According to the MPEG 4 standard, there must be at least one I frame in a validly encoded MPEG-4 video stream. FIG. 3 shows two data streams, data stream A 100 and data stream B 102, with the time index increasing from left to right. The arrows between the frames indicate the frame upon which each frame depends. Data stream A 100 is a regular MPEG 4 stream having an initial I frame 104 and a series of P frames 106a and 106b, allowing data stream A to be played back by itself. As only a fraction of the recordable frames are represented in it, the resulting video has a low frame rate. Data stream B consists of the remainder of the frames. Stream B is encoded entirely as sets of P frames 108a, 108b and 108c, where the first frame in each set references a frame in stream A and subsequent frames in the set reference other frames in stream B. If both streams are used together, one can make use of all frames from both streams with a combined frame rate of five times the frame rate of the first stream alone. Once a predetermined retention period has been reached, or other retention criteria met, the files relating to stream B can be deleted, freeing up significant disk space. One skilled in the art will appreciate that the rendering of a combined stream requires that frame 104 be reloaded at the end of rendering frames 108a, so that frame 106a can be rendered. Similarly, frame 106a is loaded prior to the rendering of frame 106b. This may introduce slight performance degradation, but in most instances, this will not be noticeable to a viewer.

Figure 4:
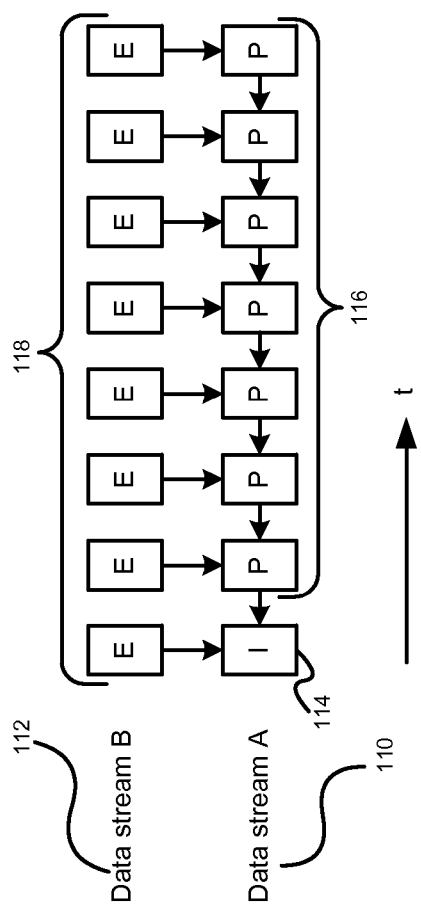
FIG. 4 is a third example of a multi-stream recording format according to the present invention.

In FIG. 4, another MPEG example is shown that allows video quality to be changed after recording, rather than frame rate. In this case, data stream A 110 is a base level stream made up of an initial I frame 114 and a subsequent series of P frames 116. These frames can be recorded using a high degree of lossy compression so that the size of the files associated with stream A is reduced while the frame rate is maintained. Data stream B 112 contains enhancement frames E 118, corresponding to each of the frames in the stream A. Techniques for encoding enhancement layers are described in the MPEG 4 standard and are well known in the art. When the two streams are combined it is possible to view video at a relatively high quality. Again, some time after recording, the files containing the stream B 112 can be deleted leaving a lower quality video stream in stream A, but freeing up storage space. One skilled in the art will appreciate that it is possible to combine this exemplary embodiment with other embodiments, so that a multi-level stream structure is created, with one stream being a low quality set of frames, another stream increasing the frame rate, and another stream of enhancement frames. This can be structured hierarchically to allow use of combinations of the streams as desired to obtain a higher quality image stream.

Figure 5:
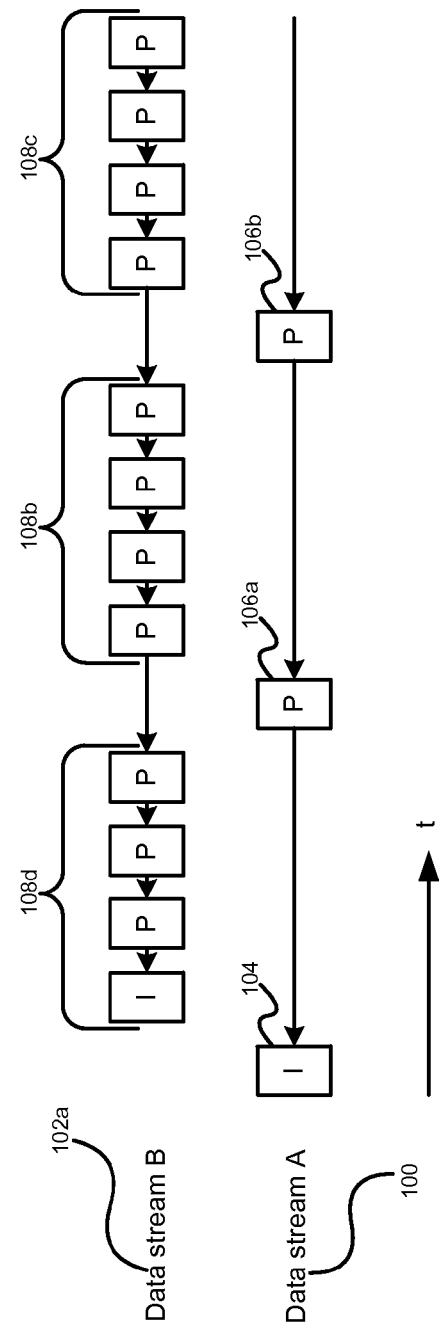
FIG. 5 is a fourth example of a multi-stream recording format according to the present invention.

A further example is depicted in FIG. 5. This example is similar to that described in relation to FIG. 3, except that stream B 102 can be decoded independently of stream A 100. The advantage of this method is that, while it still allows the dropping of data volume by deleting stream B 102, it also permits data to be reconstructed from either stream. Thus, if the two streams are recorded to different storage devices, this method provides some degree of resilience to data loss. If the disk to which stream A 100 was recorded failed, it would still be possible to make use of stream B 100. Rendering independence of stream B 102 is achieved by encoding the first frame of the first set of frames 108d as an I frame. Subsequent sets of frames 108b and 108c are identical to those illustrated in FIG. 1, save that they are dependent upon the last frame in the previous set as opposed to being dependent upon frames in stream A 100. This allows stream B 102 to be independently rendered.

Generally speaking, while it is possible that the second portion B of the overall stream might be usable alone, it should be noted that in many cases B would not be used alone. In one DVR implementation, either the first portion A or both first and second (A and B) together are used. In such case, the first portion might provide a video at ten frames per second (fps), whereas the combination might provide video at 24 fps. Alternatively, a high compression version can be stored in a the first video stream, with enhancement information reducing the lossy compression ratio in the second data stream. However, this concurs with the underlying premise of the present invention whereby the data is split into multiple streams such that combined they provide full quality, but a subset (though not necessarily just any subset) can be used to give a reduced quality rendition.

While the above examples encode the data as two streams, the present methods can be used to record and display any number of streams. For example, frames can be divided between three streams, allowing frame rates to be dropped in two steps.

Once the multi-stream video data has been generated and recorded, there are many ways in which it can be maintained. A DVR can automatically delete the data for one of the streams after a fixed number of days. For example, high quality video could be made available for 10 days, and lower quality video for another 60 days. No post-processing of the recorded data is required; instead, the files relating to the discardable stream are simply deleted or archived. To provide more control to a user, the DVR can also permit the user to indicate when data, at either high or low quality, should be deleted, or retained permanently, such as for evidence purposes.

Alternately, the DVR can use the presence of events, such as alarms and motion, to trigger it to keep both streams of video for two minutes either side of the event, and just the low frame rate stream for a further 5 minutes. This keeps the video that is most likely to be important at maximum quality while keeping some additional video at reduced quality.

It is also possible to subject audio data to a similar process as video. For example, if audio is captured as a stereo signal, it can be encoded as two streams, a mono stream and one of the original left or right channels. From these two streams it would be possible to reconstruct the original stereo signal or one could delete half the data and be left with a mono signal at half the data rate.

This invention provides a means by which data can be captured with maximum quality for use in the short term, but can later be efficiently reduced in size and quality, to achieve desired retention requirements. This provides a significant benefit over initially recording only specific events or capturing at lower quality, since the decision of what to keep and at what quality to keep it can be made with the assistance of a person who is more likely to know the importance of the data.

Normally recording at high quality and reducing the quality over time requires that both high and low quality data is captured initially and the high quality data discarded first, or that only high quality data is captured initially and it is re-processed at a later time to reduce its size and quality. This invention improves over these alternatives by not requiring redundant storage of essentially the same information or the expensive re-processing of existing data.

One skilled in the art will appreciate that in place of a digital video recorder, any digital data recorder, such as a digital audio recorder or a digital temperature recorder can be used without departing from the scope of the present invention. Digital data recorders can employ encoders to encode the digital data in partitioned data streams so that each stream can be recorded by a recorder and stored. In a playback scenario, the data streams can be recombined using reordering techniques to produce a single data stream that can be displayed or played back according to the needs of the user.

Figure 6:
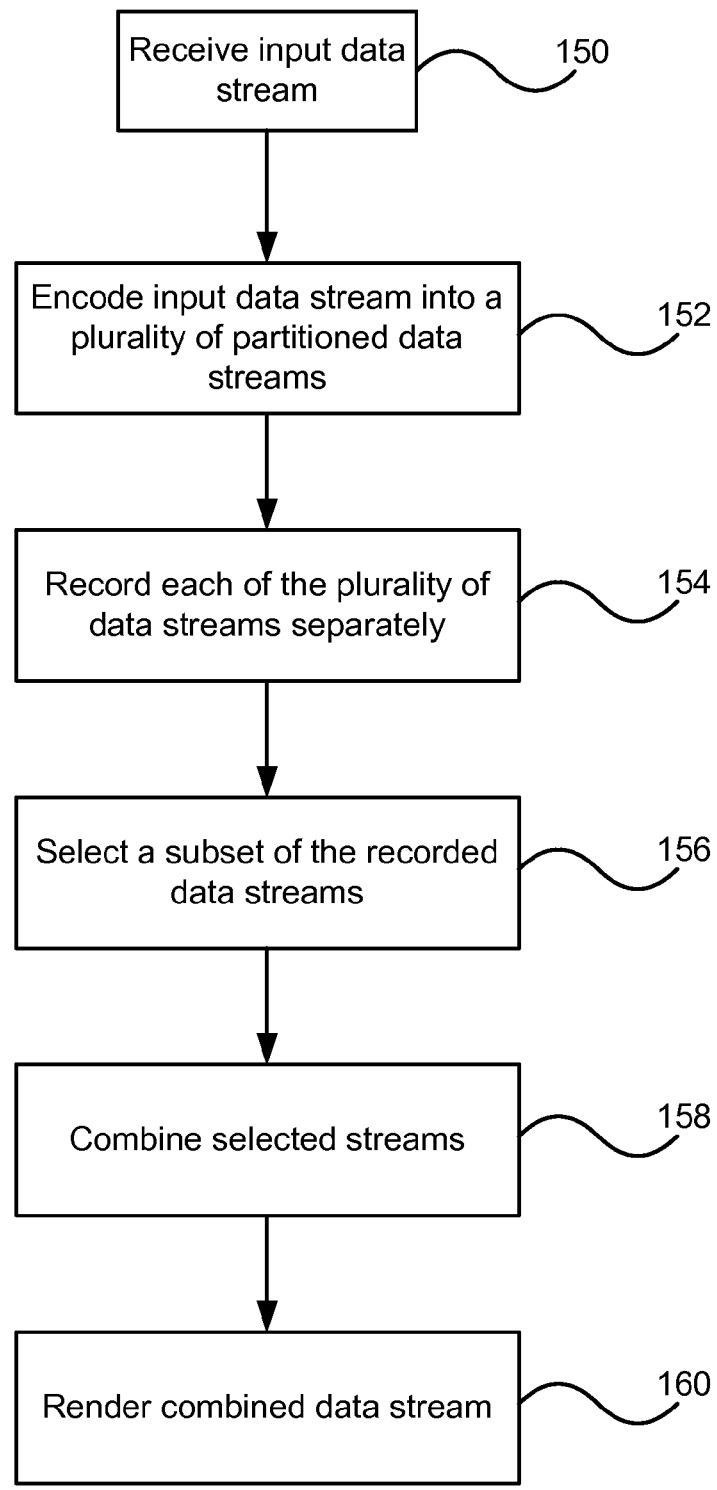
FIG. 6 is a flowchart illustrating a method of the present invention.

FIG. 6 illustrates an exemplary method of the present invention. In step 150, a data stream is received. This data stream is encoded into a series of partitioned data streams in step 152. Each of the partitioned data streams is recorded to a storage medium in step 154. This provides the hierarchical data structure used by systems of the present invention. To access the data, a subset of the recorded data streams is selected in step 156 and are combined in step 158. The combined data stream is then rendered in step 160 in a manner suitable for the type of data recorded (to a display for video data, to a speaker for audio data etc.)

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for recording and managing received input data in a digital video recording system, comprising:
   encoding the input data to provide at least two digital data streams combinable to produce a high quality representation of the input data,
   the at least two data streams including a first subset of digital data corresponding to a first portion of a complete digital data stream, the first portion capable of reconstructing a reduced quality reproduction of the complete digital data stream,
   the at least two data streams including a second subset of digital data corresponding to a second portion of the complete digital data stream, the second subset being combinable with the first subset to form a reconstructed high quality reproduction of the complete digital data stream;
   separately recording the at least two digital data streams to a storage medium; and
   in response to an event, retaining portions of both the first and second subsets recorded during a first time period associated with the event, and retaining portions of only the first subset recorded during a second time period associated with the event.

2. The method as claimed in claim 1, further including a step of combining each of the at least two the separately recorded digital data streams together to form a high quality data stream.

3. The method as claimed in claim 1 further including a step of forming a reduced quality data stream from the first subset.

4. The method as claimed in claim 3 wherein each of the separately recorded digital data streams forms a subset of a single high quality stream that corresponds to the input data.

5. The method as claimed in claim 4, wherein each of the first and second subsets of digital data includes a volume of data that is less than that of the complete digital data stream that forms the high quality representation of the input data.

6. The method of claim 1 further comprising:
   deleting portions of the second subset recorded outside the first time period associated with the event; and
   deleting portions of the first subset recorded outside both the first and second time periods associated with the event.

7. The method of claim 1 further comprising, if more than two streams are stored, deleting streams in a staggered manner so that the video quality is intentionally degraded over time.

8. The method of claim 1 wherein the first time period includes a time at which the event occurred.

9. The method of claim 8 wherein the first time period includes equal duration before and after the time at which the event occurred.

10. The method of claim 1 wherein retaining the portions of the first and second subsets recorded during the first and second time periods is performed in response to an alarm.

11. The method of claim 1 wherein retaining the portions of the first and second subsets recorded during the first and second time periods is performed in response to motion.

12. The method of claim 1 wherein the second portion of the complete digital data stream is capable of reconstructing an other reduced quality reproduction of the complete digital data stream independent of the first portion.

13. The method as claimed in claim 12, further including a step of forming the other reduced quality data stream from the second subset.

14. A digital data recorder (DDR), comprising:
a digital encoder for receiving input data, and outputting at least two digital data streams combinable to produce a high quality representation of the input data;
the at least two data streams including a first subset of digital data corresponding to a first portion of a complete digital data stream, the first portion capable of reconstructing a reduced quality reproduction of the complete digital data stream,
the at least two data streams including a second subset of digital data corresponding to a second portion of the complete digital data stream, the second subset being combinable with the first subset to form a reconstructed high quality reproduction of the complete digital data stream; and
at least two data recorders for recording the at least two digital data streams to one or more data storage means, the at least two data recorders arranged to, in response to an event, retain portions of both the first and second subsets recorded during a first time period associated with the event, and arranged to retain portions of only the first subset recorded during a second time period associated with the event.

15. The digital data recorder of claim 14 wherein the received input data includes video data and the data recorder is a digital video recorder (DVR).

16. The DDR as claimed in claim 14, wherein each of the first and second subsets of digital data includes a volume of data that is less than that of the complete digital data stream that forms the high quality representation of the input data.

17. The DDR as claimed in claim 16, wherein each of the first and second subsets of digital data is formed within separate files storable on the one or more data storage means, the separate files being independently capable of deletion.

18. The DDR as claimed in claim 17, wherein deletion of the second subset of digital data does not affect capability of the first subset to reconstruct a low quality reproduction of the complete digital stream that forms the high quality representation of the input data.

19. The DDR as claimed in claim 18, wherein the deletion of the second subset of digital data occurs during normal data purging by the DDR.

20. The DDR as claimed in claim 14 wherein the at least two data recorders are further arranged to delete portions of the second subset recorded outside the first time period associated with the event, and to delete portions of the first subset recorded outside both the first and second time periods associated with the event.

21. The DDR as claimed in claim 14 wherein if more than two streams are stored, the at least two data recorders are further arranged to delete streams in a staggered manner so that the video quality is intentionally degraded over time.

22. The DDR as claimed in claim 21 wherein the first time period includes equal duration before and after the time at which the event occurred.

23. The DDR as claimed in claim 14 wherein the first time period includes a time at which the event occurred.

24. The DDR as claimed in claim 14 the portions of the first and second subsets recorded during the first and second time periods are retained in response to an alarm.

25. The DDR as claimed in claim 14 the portions of the first and second subsets recorded during the first and second time periods are retained in response to motion.

26. The DDR as claimed in claim 14 wherein the second portion of the complete digital data stream is capable of reconstructing an other reduced quality reproduction of the complete digital data stream independent of the first portion.

27. The DDR as claimed in claim 26, wherein one of the at least two data recorders is arranged to form the other reduced quality data stream from the second subset.

28. A non-transitory machine readable medium storing statements and instructions for execution by a processor to perform a method for recording and retaining received input data in a digital video recording system, the method comprising:
encoding the input data to provide at least two digital data streams combinable to produce a high quality representation of the input data,
the at least two data streams including a first subset of digital data corresponding to a first portion of a complete digital data stream, the first portion capable of reconstructing a reduced quality reproduction of the complete digital data stream,
the at least two data streams including a second subset of digital data corresponding to a second portion of the complete digital data stream, the second subset being combinable with the first subset to form a reconstructed high quality reproduction of the complete digital data stream; and
separately recording the at least two digital data streams to a storage medium; and
in response to an event, retaining portions of both the first and second subsets recorded during a first time period associated with the event, and retaining portions of only the first subset recorded during a second time period associated with the event.

* * * * *